US012766504B2

(12) United States Patent
Monju

(10) Patent No.: US 12,766,504 B2
(45) Date of Patent: Oct. 20, 2026

(54) TESTING CHIP AND METHOD FOR MANUFACTURING SAME

(71) Applicant: Dexerials Corporation, Shimotsuke (JP)

(72) Inventor: Takuya Monju, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 484 days.

(21) Appl. No.: 18/550,133

(22) PCT Filed: Mar. 1, 2022

(86) PCT No.: PCT/JP2022/008680
§ 371 (c)(1),
(2) Date: Sep. 12, 2023

(87) PCT Pub. No.: WO2022/209535
PCT Pub. Date: Oct. 6, 2022

(65) Prior Publication Data

US 2024/0181445 A1 Jun. 6, 2024

(30) Foreign Application Priority Data

Apr. 2, 2021 (JP) ................................ 2021-063704

(51) Int. Cl.
*G01N 21/78* (2006.01)
*B01L 3/00* (2006.01)

(52) U.S. Cl.
CPC ... *B01L 3/502707* (2013.01); *B01L 3/502715* (2013.01); *G01N 21/78* (2013.01);
(Continued)

(58) Field of Classification Search
CPC ......... B01L 3/502707; B01L 3/502715; B01L 2300/0681; B01L 2300/126;
(Continued)

(56) References Cited

U.S. PATENT DOCUMENTS

2011/0123398 A1* 5/2011 Carrilho .............. F16K 99/0001
422/68.1
2011/0240151 A1 10/2011 Phillips et al.
(Continued)

FOREIGN PATENT DOCUMENTS

JP 2004061319 A 2/2004
JP 2005098790 A 4/2005
(Continued)

OTHER PUBLICATIONS

Whatman 3MM specification retrieved from https://www.sigmaaldrich.com/US/en/product/aldrich/wha3030392?srsltid=AfmBOor_qqluNRdYT8OqoW-nyC6cbMWYY4LUBJ9G-r_Z9JUC7dph2cXj (Year: 2026).*

(Continued)

*Primary Examiner* — Melvin C. Mayes
*Assistant Examiner* — Sophia Y Lyle
(74) *Attorney, Agent, or Firm* — KENJA IP LAW PC

(57) ABSTRACT

The testing chip includes a first layer on one surface side and a second layer on another surface side, in which either the first layer or the second layer has a liquid-receiving section A, the first layer has at least a detection-confirming section B, the second layer has at least a liquid-distributing section D adjacent to the detection-confirming section B and a liquid flow path E connected to the liquid-distributing section D, the testing chip is configured such that when the test liquid is dropped onto the liquid-receiving section A, the test liquid distributes in a predetermined order by capillary action to reach the detection-confirming section B, and among surfaces of the first layer and surfaces of the second layer, at least surfaces of material M other than the liquid-receiving section A are sealed with a film.

6 Claims, 9 Drawing Sheets

(52) U.S. Cl.
CPC . *B01L 2300/0681* (2013.01); *B01L 2300/126* (2013.01); *B01L 2300/161* (2013.01)

(58) Field of Classification Search
CPC ....... B01L 2300/161; B01L 2300/0816; B01L 2300/0887; B01L 2400/0406; B01L 3/50273; B01L 3/5023; G01N 21/78; G01N 33/525; G01N 35/08; G01N 2035/00108; G01N 2035/00168; G01N 37/00; G01N 21/05; G01N 33/50
See application file for complete search history.

(56) References Cited

U.S. PATENT DOCUMENTS

| | | | | |
|---|---|---|---|---|
| 2013/0267032 | A1 * | 10/2013 | Tsai | G06F 18/22 436/95 |
| 2014/0134074 | A1 * | 5/2014 | Ovaska | B01L 3/5023 156/60 |
| 2015/0367341 | A1 * | 12/2015 | Zhou | B01L 3/502707 422/430 |
| 2016/0207038 | A1 * | 7/2016 | Vella | B01L 3/502707 |
| 2017/0023556 | A1 * | 1/2017 | Shevkoplyas | G01N 30/92 |
| 2017/0043341 | A1 * | 2/2017 | Benco | B01L 3/5023 |
| 2019/0168217 | A1 * | 6/2019 | Eason | G03F 7/0955 |
| 2020/0298233 | A1 * | 9/2020 | Kwon | C12Q 1/04 |

FOREIGN PATENT DOCUMENTS

| | | | | |
|---|---|---|---|---|
| JP | 2015007604 | A | 1/2015 | |
| JP | 2015083968 | A | 4/2015 | |
| JP | 2015131257 | A | 7/2015 | |
| KR | 101493051 | B1 * | 2/2015 | G01N 35/08 |
| WO | 2012160857 | A1 | 11/2012 | |

OTHER PUBLICATIONS

Mar. 20, 2025, the Extended European Search Report issued by the European Patent Office in the corresponding European Patent Application No. 22779760.2.

Sep. 15, 2025, Office Action issued by the Taiwan Intellectual Property Office in the corresponding Taiwanese Patent Application No. 111112167.

Oct. 3, 2023, International Preliminary Report on Patentability issued in the International Patent Application No. PCT/JP2022/008680.

Jun. 23, 2025, Office Action issued by the Korean Intellectual Property Office in the corresponding Korean Patent Application No. 10-2023-7030126.

Andres W. Martinez et al., Diagnostics for the Developing World: Microfluidic Paper-Based Analytical Devices, Analytical Chemistry, Jan. 2010, pp. 3-10, vol. 82, No. 1.

Apr. 19, 2022, International Search Report issued in the International Patent Application No. PCT/JP2022/008680.

Jared Houghtaling et al., Dissolvable Bridges for Manipulating Fluid Volumes in Paper Networks, Analytical Chemistry, 2013, pp. 11201-11204, vol. 85.

* cited by examiner

TESTING CHIP AND METHOD FOR MANUFACTURING SAME

TECHNICAL FIELD

This disclosure relates to a testing chip and a method for manufacturing the same.

BACKGROUND

The idea of diagnoses that can be carried out in the immediate vicinity of patients, etc. (on-the-spot diagnoses) being important is gaining popularity in clinical establishments. Based on this idea, a testing chip has been developed to enable practical analysis by providing micro-sized flow paths and reaction spots on a sheet-shaped base material.

For example, one case of the above testing chip has a mechanism whereby when a test liquid containing a target substance such as an antigen is introduced (dropped), the test liquid flows through a flow path, and a pre-prepared labeling medium such as an antibody and the target substance react to confirm the presence of the target substance by color development (coloration). A pregnancy test drug is a typical case.

Microfluidic devices that use paper as a base material and form flow paths or reaction spots on the paper using a wax printer or inkjet printer have already been reported as testing chips as described above (Whiteside et al, Analytical Chemistry, Vol. 82, No. 1, Jan. 1, 2010 (NPL 1)). Such devices are also called "μ-PADs (microfluidic paper-based analytical devices)" and have many advantages such as (1) low cost, (2) pump-less, (3) no need for large equipment, and (4) easy disposal. Further, research is advancing worldwide to improve these μ-PADs.

For example, WO 2012/160857 A1 (PTL 1) describes that a testing chip can be manufactured simply and at low cost by printing the outer edges of the flow paths as described above and reaction spots on paper using UV-curable ink and curing the ink by irradiating it with UV light. For example, JP 2015-007604 A (PTL 2) describes that a layer containing thermoplastic material can be thermally transferred onto a porous layer to form a path with little unevenness on the sidewall surface, thereby stabilizing flow velocity.

In addition to confirming the presence or absence of a substance to be detected, it is also expected that a testing chip such as the above-described μ-PADs will perform quantification thereof (i.e., quantitative analysis). It is also important that such quantification is not dependent on the amount of test liquid introduced and can be performed easily. However, since this point has not been considered in the PTLs 1 and 2, complicated work such as weighing the test liquid with a micropipette, etc., would at least be essential for quantification.

As a start to quantification, Houghtaling et al., Analytical Chemistry, Vol. 85, 11201-11204, 2013 (NPL 2), for example, describes a technique in which a bridge consisting of soluble components is provided in advance in the middle of a flow path. With this technique, once a certain amount of the test liquid is distributed, the bridge dissolves, and subsequent liquid distribution can be blocked.

CITATION LIST

Patent Literature

PTL 1: WO 2012/160857 A1
PTL 2: JP 2015-007604 A

Non-patent Literature

NPL 1: Whiteside et al, Analytical Chemistry, Vol. 82, No. 1, Jan. 1, 2010
NPL 2: Houghtaling et al., Analytical Chemistry, Vol. 85, 11201-11204, 2013

SUMMARY

Technical Problem

All of the above-described conventional testing chips are prone to uneven color development (coloration), resulting in inconsistent testing results (inadequate reproducibility). One example is a problem wherein coloration occurs near the edges of the detection area, making it difficult to see. Such a problem can adversely affect diagnoses of important diseases, etc. Therefore, there is room for improvement in the conventional testing chips, first of all, in terms of suppressing uneven coloration. In particular, if uneven color development (coloration) as described above can be suppressed, quantification will become more realistic by identifying the area and color information of the developed part in the testing chip and applying pixel analysis technology.

With the technique of NPL 2, a test liquid comes into contact with soluble components prior to detection, which raises concerns about contamination issues and, ultimately, adverse effects on the reaction system. Therefore, there is a need to establish an alternative technique that can easily achieve quantification.

The present disclosure solves the above existing problems and achieve the following objectives. The present disclosure is helpful in providing a testing chip for confirming the presence of a target substance by coloration caused by the reaction between the target substance, which is contained in a test liquid, and a labeling medium, which is prepared in advance, in which uneven coloration is significantly suppressed and quantification can be easily achieved regardless of the amount of test liquid introduced. The present disclosure is also helpful in providing a method for manufacturing a testing chip that enables the above-described testing chip to be manufactured easily, with high accuracy, and at low cost.

Solution to Problem

In solving the above problems, the present inventor discovered that the problem with a conventional testing chip, where coloration occurs near the edges of the detection area, is due to the momentum and/or direction of the liquid flow reaching the detection area. The present inventor diligently studied the issue and found that by optimizing the liquid flow path such that the liquid reaches the detection area from the thickness direction of the sheet, coloration can be caused near the center of the detection area.

In addition, the present inventor also found that a chip, in which the liquid flow path has been optimized as described above, can control the amount of liquid reaching the detection area by sealing a predetermined region on both sides of the chip with a film.

The means to achieve the afore-mentioned objectives is as follows.

<1> A sheet-shaped testing chip, comprising:

a first layer on one surface side and a second layer on another surface side, wherein the first layer and second layer are adjacent, either the first layer or the second layer has a liquid-receiving section A, the first layer has at least a detection-confirming section B, the second layer has at least a liquid-distributing section D adjacent to the detection-confirming section B and a liquid flow path E connected to the liquid-distributing section D, in a case where the first layer has the liquid-receiving section A, the liquid-receiving section A is separate from the detection-confirming section B, the first layer is formed on one side of a sheet of sheet-shaped material, and the second layer is formed on the other side of the sheet-shaped material, the liquid-receiving section A, the liquid flow path E, the liquid-distributing section D, and the detection-confirming section B are made of a material M in which distribution of a test liquid is expressed by capillary action, parts other than parts made of the material M are made of a material in which distribution of the test liquid is not expressed, and the testing chip is configured such that when the test liquid is dropped onto the liquid-receiving section A, the test liquid distributes through the liquid-receiving section A, the liquid flow path E, and the liquid-distributing section D in this order by capillary action to reach the detection-confirming section B, and wherein among surfaces of the first layer and surfaces of the second layer, at least surfaces of the material M other than the liquid-receiving section A are sealed with a film, thereby controlling the amount of the test liquid reaching the detection-confirming section B.

<2> The testing chip according to aspect <1>, wherein the first layer has the liquid-receiving section A separate from the detection-confirming section B, the second layer has a liquid-distributing section C made of the material M, adjacent to the liquid receiving section A, and connected to the liquid flow path E, and the testing chip is configured such that when the test liquid is dropped onto the liquid-receiving section A, the test liquid distributes through the liquid-receiving section A, the liquid-distributing section C, the liquid flow path E and the liquid-distributing section D in this order by capillary action to reach the detection-confirming section B.

<3> The testing chip according to aspect <1> or <2>, wherein the material M is filter paper.

<4> The testing chip according to any one of aspects <1> to <3>, wherein the material in which distribution of the test liquid is not expressed is a material M' obtained by impregnating the material M with a hydrophobic material.

<5> The testing chip according to aspect <4>, wherein the material M' has a gastight degree of 15 seconds or less.

<6> The testing chip according to aspect <4> or <5>, wherein an impregnation ratio in which the material M is impregnated with the hydrophobic material to obtain the material M' is 70% or less.

<7> The testing chip according to any one of aspects <1> to <6>, wherein a coloring reaction caused by a substance to be detected occurs in the detection-confirming section B.

<8> A method for manufacturing the testing chip according to any one of aspects <1> to <7>, comprising:

a film formation process of using a hydrophobic material to form a first hydrophobic film on a first substrate and a second hydrophobic film on a second substrate;

a first printing process of using the first hydrophobic film on the first substrate to print on a first sacrificial base material to form an inverted design of the first layer of the testing chip;

a second printing process of using the second hydrophobic film on the second substrate to print on a second sacrificial base material to form an inverted design of the second layer of the testing chip;

a first transfer process in which the first hydrophobic film after the first printing process is transferred to one side of a sheet of sheet-shaped material and impregnated into the sheet-shaped material to form a first layer;

a second transfer process in which the second hydrophobic film after the second printing process is transferred to the other side of the sheet of sheet-shaped material and impregnated into the sheet-shaped material to form a second layer; and a sealing process in which among surfaces of the first layer and surfaces of the second layer, at least unimpregnated surfaces other than the liquid-receiving section A are sealed with a film.

Advantageous Effect

The present disclosure provides a testing chip for confirming the presence of a target substance by coloration caused by the reaction between the target substance, which is contained in a test liquid, and a labeling medium, which is prepared in advance, in which uneven coloration is significantly suppressed and quantification can be easily achieved regardless of the amount of test liquid introduced. This disclosure also provides a method for manufacturing a testing chip that enables the above-described testing chip to be manufactured easily, with high accuracy, and at low cost.

DETAILED DESCRIPTION

Figure 1A:
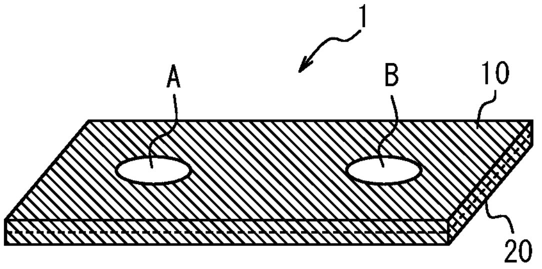
FIG. 1A is a schematic perspective view of a testing chip according to one of the embodiments of the present disclosure (film not illustrated)

The testing chip and method according to the present disclosure are described in detail below based on embodiments.

(Testing Chip)

The testing chip according to the present disclosure is a sheet-shaped testing chip, comprising:

- a first layer on one surface side and a second layer on another surface side, wherein
- the first layer and second layer are adjacent,
- either the first layer or the second layer has a liquid-receiving section A,
- the first layer has at least a detection-confirming section B,
- the second layer has at least a liquid-distributing section D adjacent to the detection-confirming section B and a liquid flow path E connected to the liquid-distributing section D,
- in a case where the first layer has the liquid-receiving section A, the liquid-receiving section A is separate from the detection-confirming section B,
- the first layer is formed on one side of a sheet of sheet-shaped material, and the second layer is formed on the other side of the sheet-shaped material,
- the liquid-receiving section A, the liquid flow path E, the liquid-distributing section D, and the detection-confirming section B are made of a material M in which distribution of a test liquid is expressed by capillary action,
- parts other than parts made of the material M are made of a material in which distribution of the test liquid is not expressed, and
- the testing chip is configured such that when the test liquid is dropped onto the liquid-receiving section A, the test liquid distributes through the liquid-receiving section A, the liquid flow path E, and the liquid-distributing section D in this order by capillary action to reach the detection-confirming section B ("first feature").

Another feature of the testing chip according to the present disclosure is that among surfaces of the first layer and surfaces of the second layer, at least surfaces of the material M other than the liquid-receiving section A are sealed with a film ("second feature"). This feature enables the testing chip disclosed herein to control the amount of the test liquid reaching the detection-confirming section B.

As used herein, "sealing" refers to restricting or blocking the outflow and inflow of gas or liquid by a coating or other means.

In the testing chip according to the present disclosure, the liquid-receiving section A is the part where the test liquid is dropped. In the testing chip disclosed herein, the detection-confirming section B is the part where the presence or absence of a target substance, such as an antigen in the test liquid dropped onto the liquid-receiving section A, is confirmed by the presence or absence of coloration. Therefore, the testing chip disclosed herein can be equipped at appropriate locations with a medium that reacts with the substance to be detected and/or a labeling medium that causes a color reaction due to the substance to be detected. Suitably, in the testing chip according to this embodiment, the coloring reaction caused by the substance to be detected occurs in the detection-confirming section B.

The testing chip may have multiple sets of combinations of detection-confirming sections B, liquid-distributing sections D, and liquid flow paths E. In this case, the presence or absence of multiple substances to be detected can be checked simultaneously in a single test.

As described above, the testing chip according to the present disclosure comprises a first layer and a second layer formed on both sides of a single sheet of sheet-shaped material (i.e., material M), and thus differs in configuration from, for example, a chip formed from two or more sheets of sheet-shaped material laminated together or a chip formed from one sheet of sheet-shaped material folded together. The testing chip disclosed herein has various advantages such as (1) avoiding the time and cost of laminating (or folding), (2) ensuring the distribution of the test liquid by capillary action between the first layer and the second layer, and (3) easy disposal since no jig or the like is required to hold the laminated (or folded) sheet-shaped material.

The testing chip according to the present disclosure can be manufactured, for example, by the testing chip manufacturing method described below.

The thickness of the testing chip according to the present disclosure is not limited, but can be, for example, 100 μm to 300 μm.

Testing Chip According to a First Embodiment

Figure 1B:
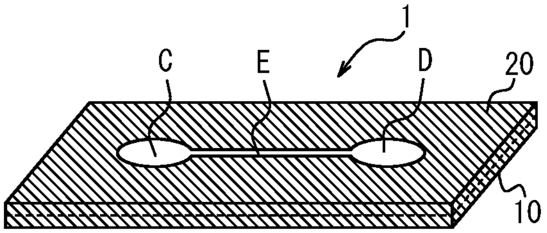
FIG. 1B is a schematic perspective view of the testing chip in FIG. 1A (film not illustrated)

FIGS. 1A and 1B are each a schematic view of a testing chip 1 of the first embodiment (the film is not illustrated; the same applies to FIGS. 2 to 4 and 6 to 11 below). The testing chip 1 has a first layer 10 on one surface side (the surface where the test results are checked when used) and a second layer 20 on another surface side (back surface). FIG. 1A is a perspective view of the testing chip 1 with the confirmation surface up, and FIG. 1B is a perspective view of the testing chip 1 with the back surface up. As illustrated in FIGS. 1A and 1B, the testing chip 1 is sheet shaped. The first layer 10 and second layer 20 in the testing chip 1 are adjacent to each other with no intervening layers in between. The shape of the testing chip 1, in plan view, is not limited and can be appropriately selected according to the purpose. For example, the shape can be rectangular as illustrated in FIGS. 1A and 1B, or it can be circular, oval, etc.

Figure 2:
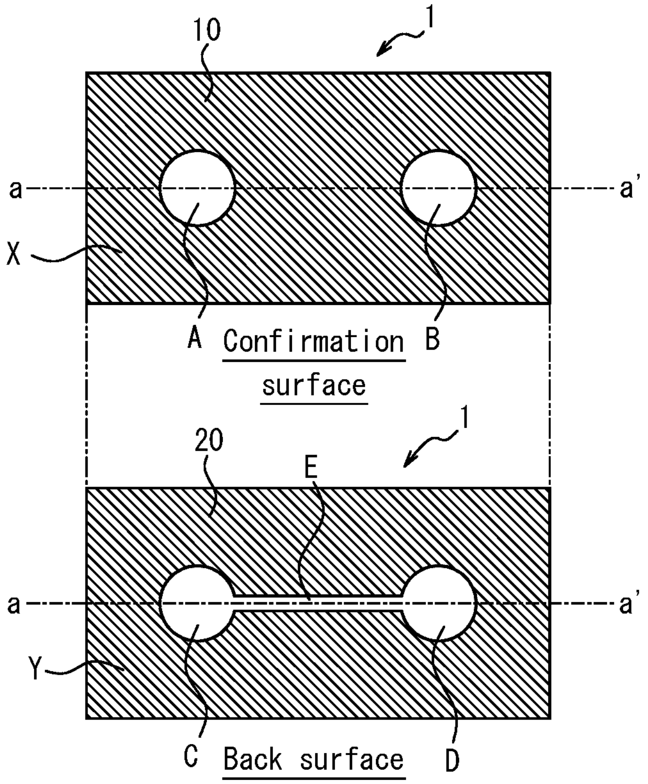
FIG. 2 is a schematic plan view of the confirmation surface and back surface of the testing chip in FIG. 1A.

FIG. 2 is a schematic plan view of the confirmation surface and back surface of the above testing chip 1, the structure of which corresponds to the testing chip 1 illustrated in FIGS. 1A and 1B. As illustrated in FIG. 2, the testing chip 1 has a liquid-receiving section A and a detection-confirming section B in the first layer 10, which is located on the confirmation surface side. The liquid-receiving section A and detection-confirming section B are separated in the first layer 10 of the testing chip 1.

Furthermore, the first layer 10 of the testing chip 1 is provided with a liquid non-distributing section X as a part other than the liquid-receiving section A and the detection-confirming section B. The liquid-receiving section A and the detection-confirming section B are made of a material M in which distribution of the test liquid is expressed by capillary action. The liquid non-distributing section X is made of a material in which distribution of the test liquid is not expressed, in particular, a material M' obtained by impregnating the material M with a hydrophobic material.

As illustrated in FIG. 2, the testing chip 1 has a liquid-distributing section C, a liquid-distributing section D, and a liquid flow path E in the second layer 20 located on the back surface side. The liquid flow path E is connected to the liquid-distributing section D and is also connected to the liquid-distributing section C. Furthermore, the second layer 20 of the testing chip 1 is provided with a liquid non-distributing section Y as a part other than the liquid-distributing section C, liquid flow path E, and liquid-distributing section D. The liquid-distributing section C, liquid flow path E, and liquid-distributing section D are made of a material M in which distribution of the test liquid is expressed by capillary action, as in the above-described liquid-receiving section A and the detection-confirming section B. The liquid non-distributing section Y, as in the above-described liquid non-distributing section X, is made of a material in which distribution of the test liquid is not expressed, in particular, a material M' obtained by impregnating the material M with a hydrophobic material.

Figure 3:
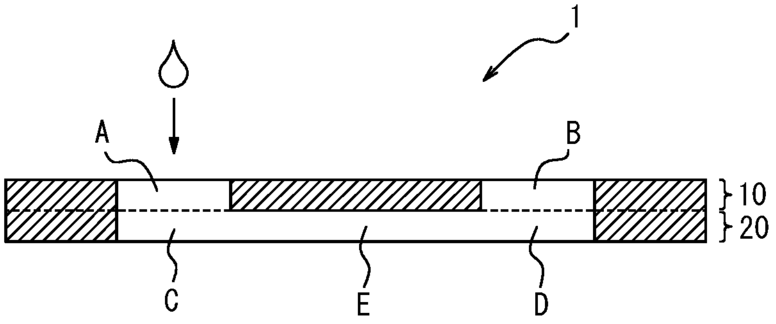
FIG. 3 is a schematic cross-sectional view of the testing chip in FIG. 1A.

A schematic cross-sectional view of the testing chip 1 in FIG. 2 when cut along the a-a' line is illustrated in FIG. 3. As illustrated in FIG. 3, in the testing chip 1 of the first embodiment, the liquid-receiving section A of the first layer 10 and the liquid-distributing section C of the second layer 20 are adjacent, and the detection-confirming section B of the first layer 10 and the liquid-distributing section D of the second layer 20 are adjacent. That is, in the testing chip 1 of the first embodiment, the liquid-receiving section A, liquid-distributing section C, liquid flow path E, liquid-distributing section D, and detection-confirming section B are adjacent or connected in this order. In other words, the testing chip 1 of the first embodiment is configured such that when the test liquid is dropped onto the liquid-receiving section A, the test liquid distributes through the liquid-receiving section A, the liquid-distributing section C, the liquid flow path E, and the liquid-distributing section D in this order by capillary action to finally reach the detection-confirming section B.

In a conventional testing chip, a liquid-receiving section, and a detection-confirming section (detection area) are simply connected by a flow path on a base material. Therefore, when a test liquid is dropped onto a liquid-receiving section, there is a problem of uneven coloration in which coloration is unevenly distributed near the edges of the detection area (particularly near the edges far from the liquid-receiving section) due to the momentum of the test liquid advancing in the surface direction of the base material and reaching the detection area. On the other hand, in the above testing chip 1, because of the above-described configuration, the test liquid dropped onto the liquid-receiving section A can finally reach the detection-confirming section B in the thickness direction of the testing chip 1 (the direction from the liquid-distributing section D to the detection-confirming section B). Therefore, the coloration area can be kept near the center of the detection-confirming section B, which significantly suppresses uneven coloration.

In the testing chip 1, an interface between the first layer 10 and the second layer 20 need not be substantially planar. The first layer 10 may have a predetermined part such as the detection-confirming section B, and the second layer 20 may have a predetermined part such as the liquid-distributing section D. The dotted line, which is a boundary line between the first layer 10 and the second layer 20 illustrated in FIG. 1A, FIG. 1B, and FIG. 3, etc. is schematic, and usually the first layer 10 and the second layer 20 are integrated.

Figure 4:
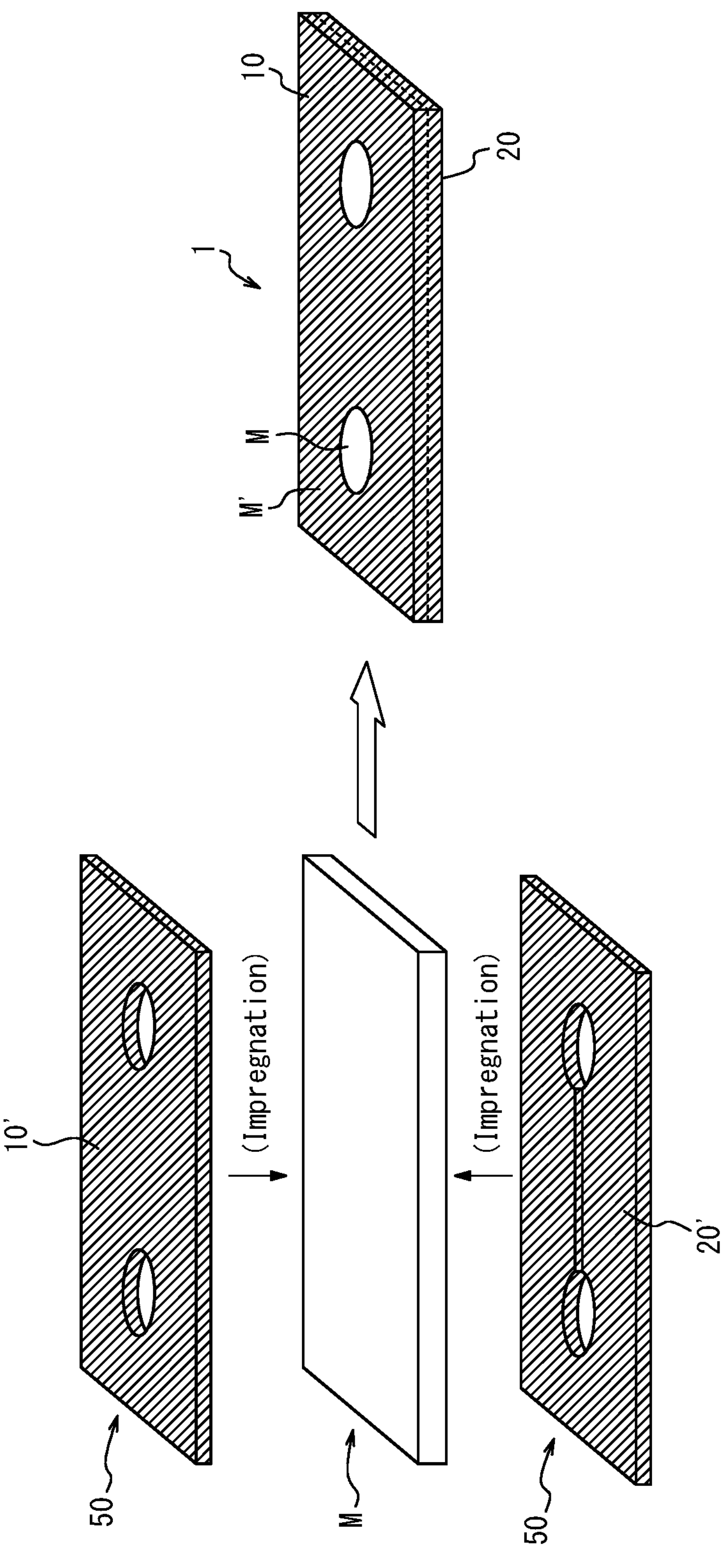
FIG. 4 is a schematic exploded view of a testing chip according to one of the embodiments of the present disclosure.

A schematic exploded view of the testing chip 1 of FIGS. 1A and 1B is illustrated in FIG. 4. As illustrated on the left side of FIG. 4, the testing chip 1 (before film sealing) is schematically formed from the material M, a pre-first layer 10' made of a hydrophobic material 50 with a design of the first layer 10, and a pre-second layer 20' made of a hydrophobic material 50 with a design of the second layer 20. The testing chip 1 has a configuration in which the pre-first layer 10' and the pre-second layer 20' are impregnated into the material M from both sides, as illustrated on the left side of FIG. 4. As illustrated on the right side of FIG. 4, the testing chip 1, from the viewpoint of material, is made of, for example, a material M and a material M' obtained by impregnating the material M with a hydrophobic material 50. Because of this configuration, there is no significant difference between the thickness of the material M illustrated on the left side of FIG. 4 and the thickness of the testing chip 1 illustrated on the right side of FIG. 4.

The material M is not limited as long as it causes capillary action. Examples may include paper such as filter paper, nonwoven fabric, nitrocellulose, polypropylene, etc. Among these, the above material M is preferably filter paper from the viewpoint of manufacturing a testing chip simply and at low cost. The thickness and weight (density) of the material M can be selected as appropriate, taking into consideration the viscosity, etc. of the test liquid.

The hydrophobic material is not limited as long as it can be impregnated into the material M and inhibits capillary action in the material M. Examples may include wax or a composition containing wax. The hydrophobic material preferably has a melting point of 90° C. or less for ease of manufacture.

In the testing chip, the material of the liquid non-distributing section X on the confirmation surface side is preferably colored such that the person testing can easily see the liquid-receiving section A and the detection-confirming section B on the confirmation surface side. On the other hand, the material M' of the liquid non-distributing section Y on the back surface side of the testing chip may be colored, white, or transparent, or may be uncolored.

Coloring of the material M' can be achieved, for example, by impregnating the material M with a colorant in addition to a hydrophobic material. Such colorants are preferably hydrophobic and may include, for example, carbon black (black pigment) and other pigments. It is preferable to select a colorant that will not adversely affect the reagents used in the testing chip.

The shape of the liquid-receiving section A, in plan view, is not limited and can be appropriately selected according to purpose. For example, the shape can be circular as illustrated in FIG. 2, or it can be oval, rectangular, or other shapes.

The shape of the detection-confirming section B, in plan view, is not limited and can be appropriately selected according to purpose. The shape can be circular as illustrated in FIG. 2, or it can be oval, rectangular, or other shapes.

The shape of the liquid-distributing section C, in plan view, is not limited and can be appropriately selected according to purpose, but the shape is preferably the same shape as the liquid-receiving section A. The liquid-distributing section C preferably has a shape that substantially matches the liquid-receiving section A, in plan view, of the testing chip.

The shape of the liquid-distributing section D, in plan view, is not limited and can be appropriately selected according to purpose, but the shape is preferably the same shape as the detection-confirming section B. The liquid-distributing section D preferably has a shape that substantially matches the detection-confirming section B, in plan view, of the testing chip.

Figure 5A:
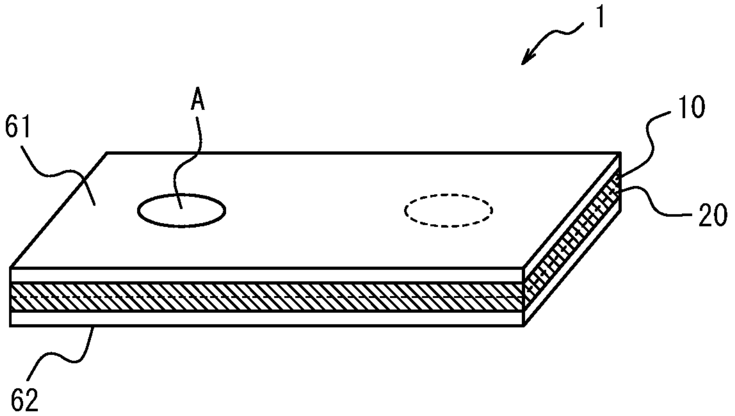
FIG. 5A is a schematic perspective view of the testing chip in FIG. 1A (film illustrated)
Figure 5B:
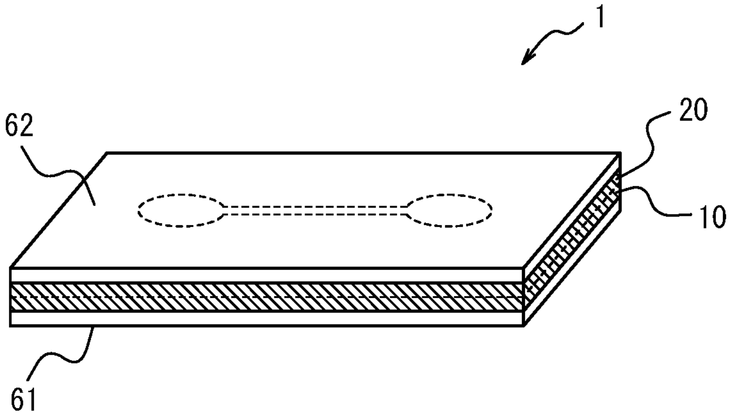
FIG. 5B is a schematic perspective view of the testing chip in FIG. 1A (film illustrated)

Furthermore, in the testing chip according to the present disclosure, among surfaces of the first layer and surfaces of the second layer, at least surfaces of the material M other than the liquid-receiving section A are sealed with a film ("second feature"). FIGS. 5A and 5B are additional illustrations of the films in the testing chip diagrams of FIGS. 1A and 1B. As illustrated in FIG. 5A, the testing chip 1 of the first embodiment is sealed by covering all surfaces of the first layer 10, other than the liquid-receiving section A, with a film 61. As illustrated in FIG. 5B, the testing chip 1 of the first embodiment is sealed by covering all surfaces of the second layer 20 with a film 62. In FIGS. 5A and 5B, the dotted lines in films 61 and 62 represent the outline of the part made of the material M in the lower layers (first layer 10 or second layer 20).

The testing chip 1 of the first embodiment, as already mentioned, is configured such that when the test liquid is dropped onto the liquid-receiving section A, the test liquid distributes through the part made of the material M, specifically, the liquid-receiving section A, liquid-distributing section C, liquid flow path E, and liquid-distributing section D in this order to finally reach the detection-confirming section B. In order for the test liquid to finally reach the detection-confirming section B, the gas that is present in the space where the test liquid is distributed should be discharged out of the system. When the liquid is distributed, most of the above gas is considered to be discharged out of the system from the point where the material M is exposed on the surface. Accordingly, as the second feature in the present disclosure, among surfaces of the first layer 10 and surfaces of the second layer 20 of the testing chip 1, surfaces of the material M other than the liquid-receiving section A are sealed with a film. Thereby, the point at which gas is discharged out of the system is restricted, and as a result, the amount of liquid reaching the detection area of the testing chip 1, i.e., the detection-confirming section B, can be controlled (regulated) regardless of the amount of test liquid introduced.

In the testing chip according to the present disclosure, the surfaces to be sealed with the film preferably include all surfaces of the material M other than the liquid-receiving section A, and more preferably include substantially all surfaces other than the liquid-receiving section A, as illustrated in FIGS. 5A and 5B. When all surfaces other than the liquid-receiving section A are sealed with the film, it is assumed that discharge of gas accompanying the distribution of liquid is mainly from the end faces of the testing chip.

Various resins and polymers can be used as the film material without any particular limitation as long as the film exhibits sealing performance. Adhesive film can also be used as the film. The film is preferably transparent in order to easily confirm the presence or absence of coloration in the detection-confirming section B.

When the above-described testing chip 1 is made of the material M (a material in which distribution of the test liquid is expressed by capillary action) and the material M' (a material obtained by impregnating the material M with a hydrophobic material and in which distribution of the test liquid is not expressed), the gastight degree of the material M' is preferably 3 seconds or more. The gastight degree of the material M' is preferably 15 seconds or less. By manufacturing a testing chip such that the gastight degree is 3 seconds or more, leakage of liquid from the flow path can be sufficiently avoided (maintaining barrier properties) and a testing chip with the desired flow path structure can be obtained more reliably. By manufacturing a testing chip such that the gastight degree is 15 seconds or less, blockage and other problems can be sufficiently avoided when impregnating the material M with a hydrophobic material, and the discharge of gas accompanying the distribution of liquid is sufficiently smooth to more reliably and more rapidly achieve a regulated amount of liquid reaching the detection-confirming section B.

When measuring the gastight degree of the material M', the material M' having a size of 40 mm×40 mm coated with films on both surfaces (one of the films should have an opening) is used as a sample for measurement. The sample is then pressed against a glass flat plate at a pressure of 1 $kg/cm^2$, and suction is applied through the opening part of the sample. The time from when the pressure difference reaches 370 mmHg to when 10 cc of gas leaks is defined as the gastight degree. More specifically, the gastight degree of the material M' can be obtained by the method described in the EXAMPLES section below.

The above gastight degree can be adjusted, for example, by adjusting the amount of hydrophobic material to be impregnated (i.e., the impregnation ratio described later), composition, viscosity, etc., and by appropriately selecting the material M.

When the above-described testing chip 1 is made of the material M (a material in which distribution of the test liquid is expressed by capillary action) and the material M' (a material obtained by impregnating the material M with a hydrophobic material and in which distribution of the test liquid is not expressed), the impregnation ratio in which the material M is impregnated with a hydrophobic material to obtain the material M' is preferably 14% or more. The impregnation ratio in which the material M is impregnated with a hydrophobic material to obtain the material M' is preferably 70% or less. By manufacturing the testing chip such that the impregnation ratio is 70% or less, blockage and other problems can be sufficiently avoided when impregnating the material M with a hydrophobic material, and the testing chip can be provided with the desired flow path structure more reliably. By manufacturing the testing chip such that the impregnation ratio is 14% or more, leakage of liquid from the flow path can be sufficiently avoided (maintaining barrier properties), and the testing chip can be provided with the desired flow path structure more reliably.

The impregnation ratio shall refer to the impregnation ratio for the material M' in the region of the testing chip 1 that is made of the material M' over the entire thickness direction.

The impregnation ratio can be considered to be 100% for material M' that is obtained by dipping material M into a hydrophobic material heated to a sufficiently low viscosity (e.g., heated at 120° C.) and maintaining the temperature for a sufficient time (e.g., 3 minutes). More specifically, the impregnation ratio is obtainable by the method described in the EXAMPLES section below.

The impregnation ratio can be adjusted, for example, by adjusting the amount of hydrophobic material to be impregnated (thickness of the hydrophobic film, etc.).

Testing Chip According to a Second Embodiment

Figure 6:
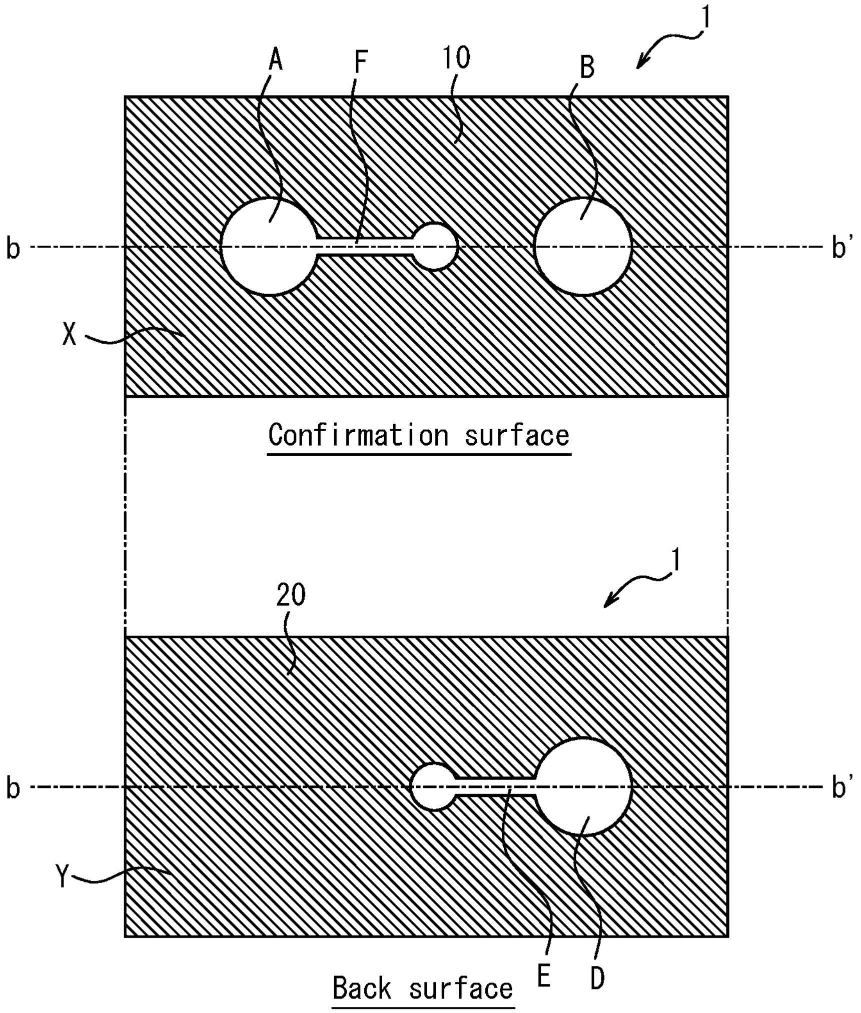
FIG. 6 is a schematic plan view of the confirmation surface and back surface of a testing chip according to one of the embodiments of the present disclosure.

FIG. 6 is a schematic plan view of the confirmation surface and the back surface of the testing chip 1 of the second embodiment (film is omitted). As illustrated in FIG. 6, the testing chip 1 has a liquid-receiving section A and a detection-confirming section B in the first layer 10, which is located on the confirmation surface side. The liquid-receiving section A and detection-confirming section B are separated in the first layer 10 of the testing chip 1. The testing chip 1 has a liquid flow path F connected to the liquid-receiving section A in the first layer 10, which is located on the confirmation surface side.

Furthermore, the first layer 10 of the testing chip 1 is provided with a liquid non-distributing section X as a part other than the liquid-receiving section A, detection-confirming section B, and liquid flow path F. The liquid-receiving section A, detection-confirming section B, and liquid flow path F are made of a material M in which distribution of the test liquid is expressed by capillary action. The liquid non-distributing section X is made, for example, of a material in which distribution of the test liquid is not expressed, in particular, a material M' obtained by impregnating the material M with a hydrophobic material.

As illustrated in FIG. 6, the testing chip 1 has a liquid-distributing section D and a liquid flow path E in the second layer 20 located on the back surface side. The liquid flow path E is connected to the liquid-distributing section D. Furthermore, the second layer 20 of the testing chip 1 is provided with a liquid non-distributing section Y as a part other than the liquid flow path E and liquid-distributing section D. The liquid flow path E and liquid-distributing section D are made of the material M in which distribution of the test liquid is expressed by capillary action, for example, as in the above-described liquid-receiving section A, detection-confirming section B, and liquid flow path F. The liquid non-distributing section Y, for example, as in the above-described liquid non-distributing section X, is made of a material in which distribution of the test liquid is not expressed, in particular, the material M' obtained by impregnating the material M with a hydrophobic material.

Figure 7:
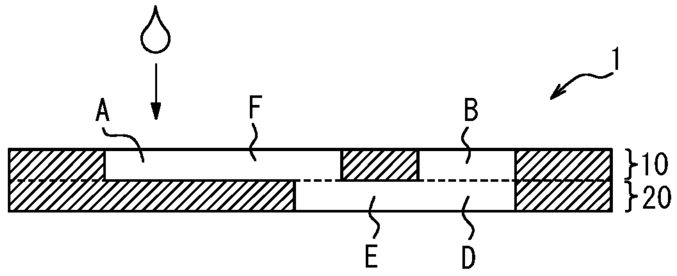
FIG. 7 is a schematic cross-sectional view of the testing chip illustrated in FIG. 6.

A schematic cross-sectional view of the testing chip 1 in FIG. 6 when cut along the b-b' line is illustrated in FIG. 7. As illustrated in FIG. 7, in the testing chip 1 of the second embodiment, the detection-confirming section B of the first layer 10 and the liquid-distributing section D of the second layer 20 are adjacent, and the liquid flow path F of the first layer 10 is connected to the liquid flow path E of the second layer 20. That is, in the testing chip 1 of the second embodiment, the liquid-receiving section A, liquid flow path F, liquid flow path E, liquid-distributing section D, and detection-confirming section B are adjacent or connected in this order. In other words, the testing chip 1 of the second embodiment is configured such that when the test liquid is dropped onto the liquid-receiving section A, the test liquid distributes through the liquid-receiving section A, liquid flow path F, liquid flow path E, and liquid-distributing section D in this order by capillary action to finally reach the detection-confirming section B. Therefore, in the testing chip 1 of the second embodiment, as in the first embodiment, the test liquid dropped onto the liquid-receiving section A can finally reach the detection-confirming section B in the thickness direction of the testing chip 1 (the direction from the liquid-distributing section D to the detection-confirming section B).

In the testing chip, the material of the liquid non-distributing section X on the confirmation surface side is preferably colored such that the person testing can easily see the liquid-receiving section A and the detection-confirming section B on the confirmation surface side. On the other hand, the material of the liquid non-distributing section Y on the back surface side of the above testing chip above may be colored, white, or transparent, or may be uncolored.

Aside from the above, matters that are common to the first embodiment are omitted.

Testing Chip According to a Third Embodiment

Figure 8:
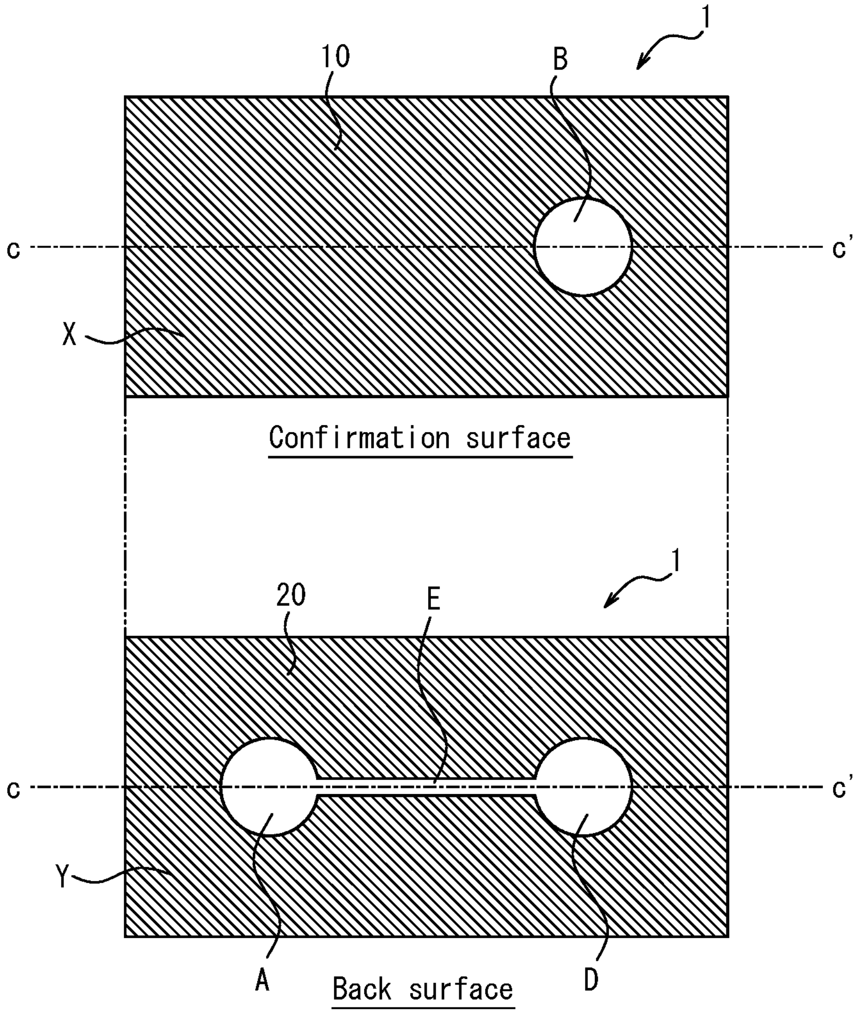
FIG. 8 is a schematic plan view of the confirmation surface and back surface of a testing chip according to one of the embodiments of the present disclosure.

FIG. 8 is a schematic plan view of the confirmation surface and the back surface of the testing chip 1 of the third embodiment (film is omitted). As illustrated in FIG. 8, the testing chip 1 has a detection-confirming section B and no liquid-receiving section A in the first layer 10, which is located on the confirmation surface side.

Furthermore, the first layer 10 of the testing chip 1 has a liquid non-distributing section X as a part other than the detection-confirming section B. The detection-confirming section B is made of a material M in which distribution of the test liquid is expressed by capillary action. The liquid non-distributing section X is made of a material in which distribution of the test liquid is not expressed, in particular, a material M' obtained by impregnating the material M with a hydrophobic material.

As illustrated in FIG. 8, the testing chip 1 has a liquid-receiving section A, a liquid-distributing section D, and a liquid flow path E in the second layer 20, which is located on the back surface side. The liquid flow path E is connected to the liquid-distributing section D and is also connected to the liquid-receiving section A. Furthermore, the second layer 20 of the testing chip 1 is provided with a liquid non-distributing section Y as a part other than the liquid-receiving section A, liquid flow path E, and liquid-distributing section D. The liquid-receiving section A, liquid flow path E, and liquid-distributing section D are made of the material M in which distribution of the test liquid is expressed by capillary action, for example, as in the above-described detection-confirming section B. The liquid non-distributing section Y, for example, as in the above-described liquid non-distributing section X, is made of a material in which distribution of the test liquid is not expressed, in particular, the material M' obtained by impregnating the material M with a hydrophobic material.

Figure 9:
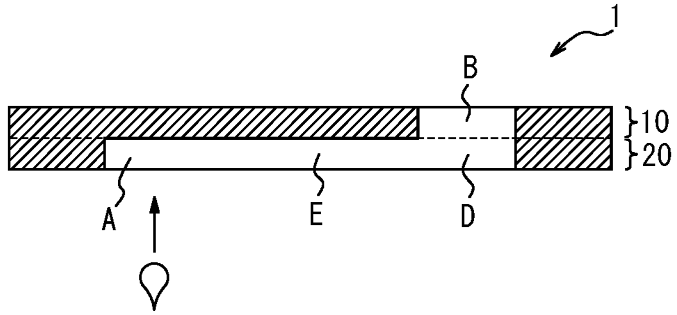
FIG. 9 is a schematic cross-sectional view of the testing chip in FIG. 8.

A schematic cross-sectional view of the testing chip 1 in FIG. 8 when cut along the c-c' line is illustrated in FIG. 9. As illustrated in FIG. 9, in the testing chip 1 of the third embodiment, the detection-confirming section B of the first layer 10 and the liquid-distributing section D of the second layer 20 are adjacent. That is, in the testing chip 1 of the third embodiment, the liquid receiving section A, the liquid flow path E, the liquid-distributing section D, and the detection-confirming section B are adjacent or connected in this order. In other words, the testing chip 1 of the third embodiment is configured such that when the test liquid is dropped onto the liquid-receiving section A, the test liquid distributes through the liquid-receiving section A, liquid flow path E, and liquid-distributing section D in this order by capillary action to finally reach the detection-confirming section B. Therefore, in the testing chip 1 of the third embodiment, as in the first embodiment, the test liquid dropped onto the liquid-receiving section A can finally reach the detection-confirming section B in the thickness direction of the testing chip 1 (the direction from the liquid-distributing section D to the detection-confirming section B).

In the above testing chip, the material M' of the liquid non-distributing section X on the confirmation surface side and the liquid non-distributing section Y on the back surface side is preferably colored such that the person testing can easily see the liquid-receiving section A and the detection-confirming section B on the confirmation surface side.

The testing chip of the third embodiment is particularly useful, for example, when it is desired to place the liquid-receiving section A and the detection-confirming section B on different surfaces from a fail-safe perspective.

Aside from the above, matters that are common to the first embodiment are omitted.

Furthermore, the testing chip according to this embodiment can have the features described below as appropriate. The following description is based on the first embodiment, but any of the features are applicable to cases with the second embodiment and third embodiment.

Figure 10:
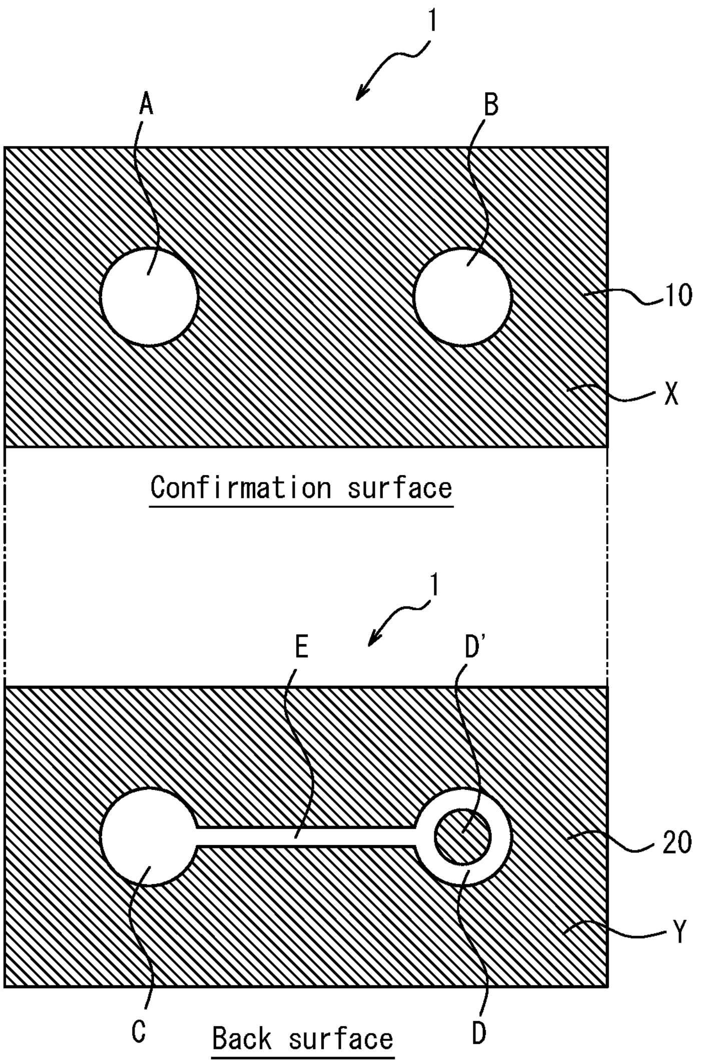
FIG. 10 is a schematic plan view of the confirmation surface and back surface a testing chip according to one of the embodiments of the present disclosure.

FIG. 10 is a schematic plan view of the confirmation surface and back surface of a testing chip 1 according to one of the embodiments. The testing chip 1 illustrated in FIG. 10 is similar to that in FIG. 2, except that the liquid-distributing section D in the second layer 20, which is located on the back surface side, has a feature of being an annular structure and a liquid non-distributing section D' is formed inside. In such a testing chip 1, the presence of the non-distributing section D' allows the test liquid to form a liquid flow from the outside toward the center in the detection-confirming section B as the test liquid advances from the liquid-distributing section D toward the detection-confirming section B. Therefore, the coloration area can be kept closer to the center of the detection-confirming section B, which further significantly suppresses uneven coloration.

In the testing chip 1 as described above, the liquid-distributing section D, which is an annular structure, can have any contour shape, such as a circular shape, oval shape, rectangular shape, etc. but preferably has a contour shape that substantially matches the detection-confirming section B, in plan view, of the testing chip. The liquid non-distributing section D' preferably has a shape that is a scaled-down version of the contour shape of the liquid-distributing section D, in plan view, of the testing chip. Furthermore, the liquid non-distributing section D' is preferably white or transparent or uncolored so as not to interfere with the confirmation of coloration in the detection-confirming section B.

Figure 11:
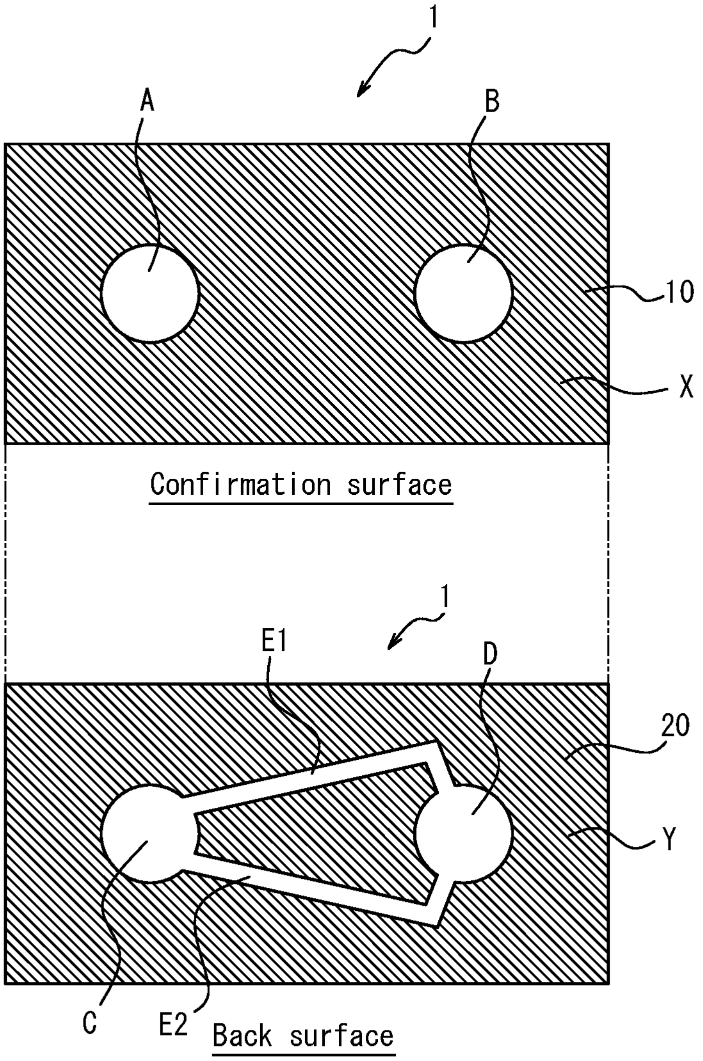
FIG. 11 is a schematic plan view of the confirmation surface and back surface of a testing chip according to one of the embodiments of the present disclosure.

FIG. 11 is a schematic plan view of the confirmation surface and back surface of a testing chip 1 according to another of the embodiments. The testing chip 1 illustrated in FIG. 11 is similar to that in FIG. 2, except that the second layer 20, which is located on the back surface side, has a feature of having multiple liquid flow paths E (two flow paths, E1 and E2, in FIG. 11). In such a testing chip 1, the presence of multiple liquid flow paths E can promote liquid flow in the thickness direction of the testing chip 1 by offsetting the momentum of the liquid flow from each of the liquid flow paths E as the test liquid advances from the liquid-distributing section D toward the detection-confirming section B. Therefore, the coloration area can be kept closer to the center of the detection-confirming section B, which further significantly suppresses uneven coloration.

With respect to the above features, in the case of the testing chip of the second embodiment, as many liquid flow paths F as the number of liquid flow paths E can be provided, and the multiple liquid flow paths F in the first layer 10 and the multiple liquid flow paths E in the second layer 20 can each be connected.

(Method for Manufacturing a Testing Chip)

A method for manufacturing a testing chip according to one of the embodiments of the present disclosure is a method for manufacturing the above-described testing chip, comprising:

a film formation process of using a hydrophobic material to form a first hydrophobic film on a first substrate and a second hydrophobic film on a second substrate;

a first printing process of using the first hydrophobic film on the first substrate to print on a first sacrificial base material to form an inverted design of the first layer of the testing chip;

a second printing process of using the second hydrophobic film on the second substrate to print on a second sacrificial base material to form an inverted design of the second layer of the testing chip;

a first transfer process in which the first hydrophobic film after the first printing process is transferred to one side of a sheet of sheet-shaped material and impregnated into the sheet-shaped material to form a first layer;

a second transfer process in which the second hydrophobic film after the second printing process is transferred to the other side of the sheet-shaped material and impregnated into the sheet-shaped material to form a second layer; and a sealing process in which among surfaces of the first layer and surfaces of the second layer, at least unimpregnated surfaces other than the liquid-receiving section A are sealed with a film.

Such a manufacturing method can easily produce the testing chip described above precisely and at low cost.

<Film Formation Process>

In the film formation process, a hydrophobic material is used to form a first hydrophobic film on the first substrate and a second hydrophobic film on the second substrate.

Colorants can be added to the hydrophobic material. Viscosity adjusting components (e.g., resins, etc.), dispersion aids, fillers, etc. can be blended into the hydrophobic material as needed. The hydrophobic material and colorant are as previously described for the testing chip.

The composition of the hydrophobic material used to form the first hydrophobic film and the composition of the hydrophobic material used to form the second hydrophobic film may be the same or different.

The above-described hydrophobic materials are preferably heated and melted to form a film. The heating temperature can be appropriately set, taking into consideration the melting points of the hydrophobic material and viscosity adjusting components. The viscosity of the hydrophobic material when melted can be appropriately selected to impregnate the sheet-shaped material to be used later, as desired, taking into consideration the thickness and density of the sheet-shaped material.

Although the viscosity of the hydrophobic material is not particularly limited, from the viewpoint of sufficiently avoiding blockage and other problems when the material is impregnated, the viscosity is preferably 100 mPa·s or less at 140° C. with a shear rate of 3000 $s^{-1}$, more preferably 50 mPa·s or less, and further preferably 30 mPa·s or less.

The first substrate and the second substrate are not components of the finally obtainable testing chip. For example, polyesters such as polyethylene terephthalate (PET) and polyethylene naphthalate (PEN), polyphenylene sulfide (PPS), and films made of cellophane, etc. can be used as the first substrate and the second substrate. The first substrate and the second substrate may have any shape, such as a ribbon- or film-like shape, etc. The same substrate may be used as the first substrate and the second substrate.

In the film formation process, a hydrophobic film can be formed on the first substrate and the second substrate by applying the above-described hydrophobic material. It is preferable to maintain heating the first substrate and the second substrate beforehand during the coating process. The thickness of the first hydrophobic film and the second hydrophobic film to be formed can be appropriately selected, taking into consideration the thickness, impregnation ratio, and other factors of the sheet-shaped material to be used later.

<First Printing Process and Second Printing Process>

In the first printing process, the first hydrophobic film formed on the above first substrate is used to print on the first sacrificial base material. In the second printing process, the second hydrophobic film formed on the above second substrate is used to print on the second sacrificial base material.

The first sacrificial base material and the second sacrificial base material are not components of the finally obtainable testing chip and are one of the components used for manufacturing testing chips. The first sacrificial base material and the second sacrificial base material are preferably general-purpose, capable of being printed with high precision, and may be for example, high-quality paper, coated paper, synthetic paper, etc. The same base material may be used as the first sacrificial base material and the second sacrificial base material.

There is no particular limitation when printing on the first sacrificial base material and the second sacrificial base material, but a label writer, for example, that is commonly used for office supplies can be suitably used. In the first printing process, the first hydrophobic film on the first substrate is used to print on the first sacrificial base material to form an inverted design of the first layer of the testing chip. In the second printing process, the second hydrophobic film on the second substrate is used to print on the second sacrificial base material to form an inverted design of the second layer of the testing chip. In this regard, taking the case of the manufacture of the testing chip illustrated in FIG. 2, the design printed on the first sacrificial base material is a design with a printed film corresponding to the liquid-receiving section A and the detection-confirming section B. The design printed on the second sacrificial base material is a design with a printed film corresponding to the liquid-distributing section C, liquid-distributing section D, and liquid flow path E.

The design to be printed can be created in advance by, for example, a personal computer, and data can be imported into a printing device. The first and second printing processes may be performed simultaneously.

<First Transfer Process and Second Transfer Process>

In the first transfer process, the first hydrophobic film after the first printing process is transferred to one side of one sheet of sheet-shaped material and impregnated into the sheet-shaped material to form the first layer. In the second transfer process, the second hydrophobic film after the second printing process is transferred to the other side of the one sheet of sheet-shaped material and impregnated into the sheet-shaped material to form the second layer.

In this case, the parts where the test liquid is distributed (liquid-receiving section A which either the first layer or the second layer has, detection-confirming section B which the first layer has, and liquid-distributing section D and liquid flow path E which the second layer has) correspond to unimpregnated parts.

A laminator or other transfer device may be used to transfer the hydrophobic films. When transferring the first hydrophobic film on the first substrate and the second hydrophobic film on the second substrate, the respective transfer positions should be appropriately adjusted according to the desired design of the testing chip.

The sheet-shaped material is as previously described for the material M.

Impregnation of the hydrophobic film into the sheet-shaped material can be achieved, for example, by heating. In this regard, for example, a transfer device such as a heatable laminator can be used to both transfer and impregnate the hydrophobic film.

In the first transfer process and the second transfer process, at least part of the first hydrophobic film transferred from on the first substrate and the second hydrophobic film transferred from on the second substrate should be in contact in the material M by the above impregnation. In other words, the hydrophobic film should be impregnated over the entire thickness direction at areas on the sheet-shaped material where the hydrophobic film is transferred on both sides when viewed in the thickness direction. On the other hand, at areas where the hydrophobic film is transferred to only one surface of the sheet-shaped material when viewed in the thickness direction, the hydrophobic film should not be impregnated to the other surface. Such adjustment can be made, for example, by appropriately adjusting the viscosity of the above-described hydrophobic material, the thickness of the sheet-shaped material, and the thickness of the hydrophobic film, etc.

In the first transfer process and the second transfer process, all transferred hydrophobic films can be impregnated into the sheet-shaped material. In this case, the thickness of the sheet-shaped material hardly changes before and after the first transfer process and the second transfer process (however, there is a possibility that the thickness may decrease due to the effect of compression by the laminator or other means).

The first transfer process may be performed before the second transfer process or after the second transfer process. Alternatively, the first transfer process and the second transfer process may be performed simultaneously in one batch. In such a case, the sheet-shaped material can be sandwiched between the first substrate and the second substrate such that the hydrophobic film is in contact with the sheet-shaped material.

After the first transfer process and the second transfer process, the first substrate and the second substrate can be peeled off as appropriate. Substances that produce a coloring reaction (e.g., enzymes) can be placed at appropriate locations in unimpregnated parts.

<Sealing Process>

In the sealing process, among surfaces of the first layer formed in the first transfer process and surfaces of the second layer formed in the second transfer process, at least unimpregnated surfaces other than the liquid-receiving section A are sealed with a film. Thus, the testing chip according to this embodiment can be obtained. The film is as previously described for the testing chip.

In the sealing process, the film is preferably hollowed out or cut in advance such that at least the surface of the liquid-receiving portion A is exposed when the film is placed.

In the method for manufacturing testing chips according to this embodiment, since the above-described predetermined printing process and transfer process are performed, testing chips can be manufactured with fewer transfer defects and voids and higher precision even if a sheet-shaped material with a comparatively rough surface, such as commercially available filter paper, for example, is used.

In the method for manufacturing testing chips according to this embodiment, on-demand based manufacturing is possible because the first layer and the second layer with the desired design can be formed without the use of molds, etc.

In addition, because the testing chip can be manufactured by forming the first layer and the second layer on both sides of a sheet of sheet-shaped material in the manufacturing method for the testing chip according to this embodiment compared to a case of manufacturing by using two sheets of sheet-shaped material (or folding one sheet of material), the testing chip has various advantages such as (1) avoiding the time and cost of laminating (or folding), (2) ensuring the distribution of the test liquid by capillary action between the first layer and the second layer of the resulting testing chip, and (3) easy disposal of the resulting testing chip since no jig or the like is required to hold the laminated (or folded) sheet-shaped material.

EXAMPLES

The following examples and comparative examples are provided to describe the testing chip and method according to the present disclosure in more detail, but the testing chip and method disclosed herein are not restricted to the following examples.

Experiment 1

First, the present inventor examined the effects of the design (flow path structure) of the first layer and the second layers of testing chips with no film sealing on color unevenness.

48 parts by mass of paraffin wax ("Paraffin Wax-155" manufactured by Nippon Seika Co., Ltd.), 48 parts by mass of synthetic wax ("Dia Carna® 80" manufactured by Mitsubishi Chemical Corporation; Dia Carna is a registered trademark in Japan, other countries, or both), 2 parts by mass of ethylene-vinyl acetate copolymer resin ("Ultrasen® 681" manufactured by Tosoh Corporation; Ultrasen is a registered trademark in Japan, other countries, or both), and 2 parts by mass of carbon black ("MA-100" manufactured by Mitsubishi Chemical Corporation) as a coloring agent were blended, and then melt mixed at 100° C. At this time, a sand mill was used to disperse each component. The hydrophobic material was prepared in this way.

A substrate ("Lumirror® #5A-F531" polyester film manufactured by Toray Industries, Inc. with one side subjected to heat-resistant treatment; Lumirror is a registered trademark in Japan, other countries, or both) was placed on a hot plate held at 120° C., with the other side not subjected to heat-resistant treatment facing up. Next, the above hydrophobic material, which was maintained in a molten state at 120° C., was applied onto the substrate using a Mayer bar to form ribbon-shaped hydrophobic films (the first hydrophobic film and the second hydrophobic film) with a thickness of approximately 6 μm to 12 μm.

Next, using a label writer ("Tepla SR750" manufactured by King Jim Corporation), the above-described hydrophobic films were printed on fine paper as a first sacrificial base material to form a desired design created in advance on a personal computer. Similarly, the above-described hydrophobic films were printed on fine paper as a second sacrificial base material to form a desired design created in advance on a personal computer. The above two designs printed on the fine paper each correspond to the inverted designs on the confirmation surface (first layer) and the back surface (second layer) of the finally obtainable testing chip. Note that the fine paper after printing is not particularly used in later processes.

Figure 12:
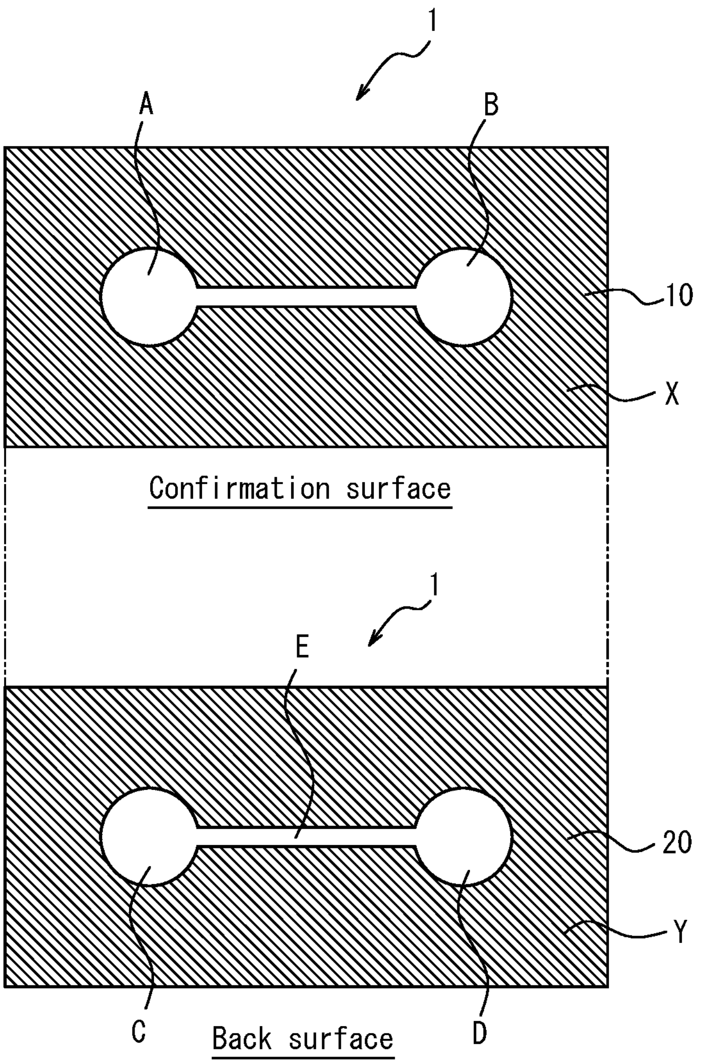
FIG. 12 is a schematic plan view of the confirmation surface and back surface of a testing chip in a comparative example.

Here, in Comparative Example 1, the design of the confirmation surface (the first layer) and the design of the back surface (the second layer) are as illustrated in FIG. 12. That is, in Comparative Example 1, the liquid-receiving section A and the detection-confirming section B are connected by a liquid flow path on the confirmation surface, and the designs of the confirmation surface and the back surface are substantially identical. In Reference Example 1-1 and Reference Example 1-2, the design of the confirmation surface (the first layer) and the design of the back surface (the second layer) are as illustrated in FIG. 2 and FIG. 10, respectively.

The above printed substrates were then used to sandwich filter paper (Whatman grade 41), with the hydrophobic films in contact with the filter paper, as the sheet-shaped material M while adjusting the position accordingly. Then, using a laminator maintained at 90° C., the hydrophobic films were transferred to both sides of the filter paper in one batch. Each hydrophobic film was almost completely impregnated from both sides of the filter paper, hydrophobizing the part of the filter paper directly below. As a result, a first layer with a predetermined design was formed on the confirmation surface side of the filter paper, and a second layer with a predetermined design was formed on the back surface side of the filter paper. In the areas of the filter paper where the hydrophobic film was transferred to both sides in the thickness direction, the hydrophobic film was impregnated over the entire thickness direction, and in the areas where the hydrophobic film was transferred to only one surface in the thickness direction, the impregnation was not allowed to reach the other surface.

The substrates on both sides were then peeled off, and a testing chip (with no film sealing) was finally obtained.

<Evaluation of Color Unevenness>

Each obtained testing chip was placed with the confirmation surface (the first layer) on the upper side, and the center of the detection-confirming section area B was marked with a water-based red fluorescent pen. Then, three drops of distilled water were dropped with a dropper onto the liquid-receiving section A, and the change in the red mark caused by the flow of water was observed.

As a result, in Comparative Example 1 (FIG. 12), the red mark in the center of the detection-confirming section B moved to the periphery of the detection-confirming section B (particularly, that which is far from the liquid-receiving section A), making it difficult to visually confirm the red color. Therefore, the testing chip in Comparative Example 1 is recognized to produce uneven coloration.

In contrast, in Reference Example 1-1 (FIG. 2) and Reference Example 1-2 (FIG. 10), the mark of the fluorescent pen in the center of the detection-confirming section B stayed further inward from the periphery of the detection-confirming section B. In particular, in Reference Example 1-2 (FIG. 10), the fluorescent pen mark in the center of the detection-confirming section B stayed closer to the center of the detection-confirming section B. This is considered to be because the liquid flow path is optimized such that water can be distributed three-dimensionally within the filter paper compared to Comparative Example 1. Therefore, the testing chips of Reference Example 1-1 and Reference Example 1-2 are recognized as significantly suppressing uneven coloration.

Experiment 2

Next, the present inventor examined the effect of film sealing on the behavior of a liquid reaching the detection area.

72.0 parts by mass of paraffin wax ("Paraffin Wax-135" manufactured by Nippon Seika Co., Ltd.), 18.0 parts by mass of synthetic wax ("Dia Carna® 30" manufactured by Mitsubishi Chemical Corporation), 1.8 parts by mass of carbon black as a coloring agent ("MA-100" manufactured by Mitsubishi Chemical Corporation), and 11.25 parts by mass of resin ("Ultrasen® 722" manufactured by Tosoh Corporation) were blended to prepare the hydrophobic material (Ink 1). The viscosity of Ink 1 was 23 mPa·s at 140° C. with a shear rate of 3000 $s^{-1}$, and the density was 0.85 $g/cm^3$.

Testing chips (with no film sealing) were then obtained in generally the same manner as in Experiment 1, except that Ink 1 was used as the hydrophobic material. In this case, the thicknesses of the ribbon-shaped hydrophobic films (the first hydrophobic film and the second hydrophobic film) were both 10.8 μm, the designs of the first layer and the second layer are generally as illustrated in FIG. 2, and the liquid-receiving section A was 5 mm in diameter.

Furthermore, in Example 2, the entire surface of the second layer of the testing chip was covered (sealed) with a film ("660PF" manufactured by Nichiban Corporation), and the surface of the first layer was covered (sealed) with the film with a ϕ6 mm hole, leaving the surface of liquid-receiving section A exposed. On the other hand, in Comparative Example 2, such film sealing was not performed.

The testing chips of Example 2 (with film sealing) and Comparative Example 2 (with no film sealing) were placed with the surfaces of the first layer sides facing up. Then, a predetermined amount of a colored aqueous solution in which food coloring was dissolved was weighed and dropped into the liquid-receiving section A. In each case, the detection-confirming section B was photographed with a digital camera at 5 minutes after the start of the drop, and the Lab value was obtained using the image analysis application "ImageJ". In each of Example 2 and Comparative Example 2, the above test was performed by changing the drop volume of a colored aqueous solution to 5 μL, 8 μL, 12 μL, and 16 μL as appropriate. The Lab value when the drop of colored aqueous solution was 5 μL was used as the reference (zero), and the change in Lab value when the drop volume was increased was calculated as the color difference ΔE. The results are listed in Table 1.

TABLE 1

| Drop volume (μL) | Comp. Ex. 2 (No sealing) ΔE | Example 2 (With sealing) ΔE |
|---|---|---|
| 5 | 0.00 | 0.00 |
| 8 | 11.72 | 4.41 |
| 12 | 11.73 | 5.47 |
| 16 | 13.72 | 5.95 |

Table 1 illustrates that in Example 2, the change in ΔE when the drop volume is increased is small compared to that of Comparative Example 2. From this it can be understood that the film sealing of the predetermined surface of the testing chip enables the amount of liquid reaching the detection confirmation area B to be regulated, even if the drop volume onto the liquid-receiving section A is excessive.

Next, for the testing chips of Example 2 and Comparative Example 2, 16 μL of the colored aqueous solution, which is considered an excess amount, was weighed and dropped onto the liquid-receiving section A. Then, the detection-confirming section B was photographed with a digital camera at 3, 5, 7, 9, and 12 minutes after the start of the drop, and the Lab value was obtained in the same manner as above. In each of Example 2 and Comparative Example 2, the Lab value at 3 minutes after the start of the drop was used as the reference (zero), and the subsequent change in Lab value was calculated as the color difference ΔE. The results are listed in Table 2.

TABLE 2

| Elapsed time (min) | Comp. Ex. 2 (No sealing) ΔE | Example 2 (With sealing) ΔE |
|---|---|---|
| 3 | 0.00 | 0.00 |
| 5 | 7.74 | 2.53 |
| 7 | 10.73 | 2.51 |
| 9 | 11.16 | 2.97 |
| 12 | 11.66 | 2.92 |

Table 2 illustrates that the values of ΔE in Example 2 after 5 minutes after the drop are generally small compared to those of Comparative Example 2. From this it can be understood that the film sealing of a predetermined surface of the testing chip can reduce the amount of liquid reaching the detection-confirming section B itself. Table 2 illustrates that in Comparative Example 2, the increase in ΔE value still continues even after 7 minutes after the drop, whereas in Example 2, the increase in ΔE value is largely subsided at 5 minutes after the drop. That is, the film sealing of the predetermined surface of the testing chip causes the amount of liquid reaching the detection-confirming section B to saturate at an early stage, and thus a reduction in test time can be expected.

Experiment 3

Next, the present inventor examined various properties of the testing chip that could ensure good liquid distribution and flow path barrier properties.

The same filter paper (Whatman Grade 41) used in Experiment 2 was cut into 5 cm×2 cm pieces, dried at 120° C. for 3 min, and the dry mass M0 (g) was measured. The filter paper was then dipped into the same hydrophobic material (Ink 1) used in Experiment 2 and left at 120° ° C. for 3 minutes. After immersion, the filter paper was sandwiched between the same type of filter paper and a glass slide and allowed to stand at 120° C. for 1 minute under a load of 100 gf to remove excess hydrophobic material. The mass of the filter paper, M1 (g), was then measured. The maximum impregnation amount per unit area, $P_{max}$, was calculated from (M1−M0)×1000, and $P_{max}$=68.3 $g/m^2$.

Testing chips (with no film sealing) with the designs of the first layer and the second layer are generally as illustrated in FIG. 2 were then obtained in generally the same manner as in Experiment 2, except that the thicknesses of the first hydrophobic film used to form the first layer and the second hydrophobic film used to form the second layer were appropriately changed as indicated in Table 3. The liquid-receiving section A in each case was 5 mm in diameter.

Then, as in Example 2 of Experiment 2, the entire surface of the second layer of the testing chip was covered (sealed) with a film ("660PF" manufactured by Nichiban Corporation), and the surface of the first layer was covered (sealed) with the film with a ϕ6 mm hole, leaving the surface of the liquid-receiving section A exposed to obtain the testing chips (with film sealing) from Example 3-1 to Example 3-4. The conditions of Example 3-2 correspond to those of Example 2 of Experiment 2.

(Impregnation Ratio of Hydrophobic Material)

For each case, the actual impregnation amount, P (g/$m^2$), per unit area was calculated using the density of Ink 1, and the impregnation ratio (%) of the hydrophobic material on the filter paper was calculated from $(P/P_{max})\times 100$. The calculated values of the impregnation ratio are listed in Table 3.

(Gastight Degree of the Impregnated Portion (Material M'))

The filter paper used in each case, i.e., Whatman Grade 41, was cut to a size of 40 mm×40 mm. A hydrophobic film with the same composition and thickness as the first hydrophobic film in each case was transferred to the entire surface of one side of the filter paper, while at the same time a hydrophobic film with the same composition and thickness as the second hydrophobic film in each case was transferred to the entire surface of the other side of the filter paper. Thus, the entire 40 mm×40 mm sized filter paper was impregnated with a hydrophobic material to obtain a material M'. The entire surface of one side of the impregnated filter paper was then covered (sealed) with the film used in each case, i.e., "660PF" manufactured by Nichiban Corporation, and the other side was covered (sealed) with a similar film with a 6 mm diameter opening to prepare a sample for measurement. Then, using a Beck smoothness tester, the above sample was pressed against a glass flat plate with the opening part facing the suction part at a pressure of 1 kg/$cm^2$, and after suctioning until the pressure difference reached 370 mmHg, the time (seconds) until 10 cc of gas leaked was measured as the gastight degree of the material M'. The measurement results are listed in Table 3. Any leakage at this time was guided from the end faces of the sample to the suction section in the plane direction.

<Evaluation of Liquid Distribution>

Each obtained testing chip (with film sealing) was placed with the surface of the first layer side facing up. Then, approximately 0.3 mL of a liquid of aqueous fluorescent ink dissolved in distilled water was dropped onto the liquid-receiving section A with a dropper, and the time (distribution time) from the start of the drop until the liquid reached detection-confirming section B was measured. The measurement results are listed in Table 3. The shorter the distribution time, the better the liquid distribution.

<Evaluation of Flow Path Barrier Properties>

Each obtained testing chip (with film sealing) was placed with the surface of the first layer side facing up. Next, a drop of aqueous fluorescent ink dissolved in distilled water was dropped onto the liquid receiving area A. The presence or absence of liquid leakage from the flow path was visually confirmed using a UV lamp. If no liquid leakage was confirmed, the flow path barrier was rated as good. The results are listed in Table 3.

From Table 3, it can be said that all of Example 3-1 through Example 3-4 have good liquid distribution and flow path barrier properties. From this it can be considered that good liquid distribution properties and flow path barrier properties can be more reliably ensured if the gastight degree of the material M' is approximately 15 seconds or less. Similarly, it can be considered that the impregnation ratio of a hydrophobic material should be approximately 70% or less to more reliably ensure liquid distribution properties and flow path barrier properties.

INDUSTRIAL APPLICABILITY

The present disclosure provides a testing chip for confirming the presence of a target substance by coloration caused by the reaction between the target substance, which is contained in a test liquid, and a labeling medium, which is prepared in advance, in which uneven coloration is significantly suppressed and quantification can be easily achieved regardless of the amount of test liquid introduced. This disclosure also provides a method for manufacturing a testing chip that enables the above-described testing chip to be manufactured easily, with high accuracy, and at low cost.

REFERENCE SIGNS LIST

1 Testing chip
10 First layer
10' Pre-first layer
20 Second layer
20' Pre-second layer
50 Hydrophobic material
61 Film (for first layer)
62 Film (for second layer)
A Liquid-receiving section
B Detection-confirming section
C, D Liquid-distributing sections
D' Liquid non-distributing section
E, E1, E2 Liquid flow paths
F Liquid flow path
M Material in which distribution of the test liquid is expressed
M' Material in which distribution of the test liquid is not expressed
X, Y Liquid non-distributing sections

The invention claimed is:

1. A sheet-shaped testing chip, comprising:
a first layer on one surface side and a second layer on another surface side, wherein
the first layer and second layer are adjacent,
either the first layer or the second layer has a liquid-receiving section A,

TABLE 3

| | | EXAMPLE 3-1 | EXAMPLE 3-2 | EXAMPLE 3-3 | EXAMPLE 3-4 |
|---|---|---|---|---|---|
| Thickness of first hydrophobic film | [μm] | 6 | 10.8 | 21.6 | 21.6 |
| Thickness of second hydrophobic film | [μm] | 10.8 | 10.8 | 21.6 | 32.5 |
| Total thickness of hydrophobic film | [μm] | 16.8 | 21.6 | 43.3 | 54.1 |
| Actual impregnation amount (P) | [g/$m^2$] | 14.3 | 18.4 | 36.8 | 46.0 |
| Impregnation ratio of hydrophobic material | [%] | 20.9 | 26.9 | 53.9 | 67.3 |
| Gas density in impregnated portion | [sec] | 7.4 | 6.6 | 9.5 | 12.9 |
| Distribution time | [sec] | 51 | 60.5 | 162.3 | 187.5 |
| Flow path barrier properties | | good | good | good | good |

the first layer has at least a detection-confirming section B, the second layer has at least a liquid-distributing section D adjacent to the detection-confirming section B and a liquid flow path E connected to the liquid-distributing section D, in a case where the first layer has the liquid-receiving section A, the liquid-receiving section A is separate from the detection-confirming section B, the first layer is formed on one side of a sheet of sheet-shaped material, and the second layer is formed on the other side of the sheet-shaped material, the liquid-receiving section A, the liquid flow path E, the liquid-distributing section D, and the detection-confirming section B are made of a material M in which distribution of a test liquid is expressed by capillary action, parts other than parts made of the material M are made of a material in which distribution of the test liquid is not expressed, the testing chip is configured such that when the test liquid is dropped onto the liquid-receiving section A, the test liquid distributes through the liquid-receiving section A, the liquid flow path E, and the liquid-distributing section D in this order by capillary action to reach the detection-confirming section B, among surfaces of the first layer and surfaces of the second layer, at least surfaces of the material M other than the liquid-receiving section A are sealed with a film, thereby controlling the amount of the test liquid reaching the detection-confirming section B, the material in which distribution of the test liquid is not expressed is a material M' obtained by impregnating the material M with a hydrophobic material, the material M' has a gastight degree of 15 seconds or less, the gastight degree of the material M' being specified by coating the material M' having a size of 40 mm×40 mm with films on both surfaces where one of the films has an opening to prepare a sample, pressing the sample against a glass flat plate at a pressure of 1 $kg/cm^2$ with applying suction through the opening, and measuring a time from when the pressure difference reaches 370 mmHg to when 10 cc of gas leaks as the gastight degree, and an impregnation ratio in which the material M is impregnated with the hydrophobic material to obtain the material M' is 70% or less.

2. The testing chip according to claim 1, wherein the first layer has the liquid-receiving section A separate from the detection-confirming section B, the second layer has a liquid-distributing section C made of the material M, adjacent to the liquid receiving section A, and connected to the liquid flow path E, and the testing chip is configured such that when the test liquid is dropped onto the liquid-receiving section A, the test liquid distributes through the liquid-receiving section A, the liquid-distributing section C, the liquid flow path E and the liquid-distributing section D in this order by capillary action to reach the detection-confirming section B.

3. The testing chip according to claim 1, wherein the material Mis filter paper.

4. The testing chip according to claim 1, wherein the gastight degree is 12.9 seconds or less.

5. The testing chip according to claim 1, wherein the impregnation ratio is 67.3% or less.

6. The testing chip according to claim 1, wherein a coloring reaction caused by a substance to be detected occurs in the detection-confirming section B.

* * * * *